Dec. 14, 1926.  1,610,787
A. J. JANSSON
CUSHION CONNECTION FOR VEHICLE CONSTRUCTION
Filed May 18, 1925
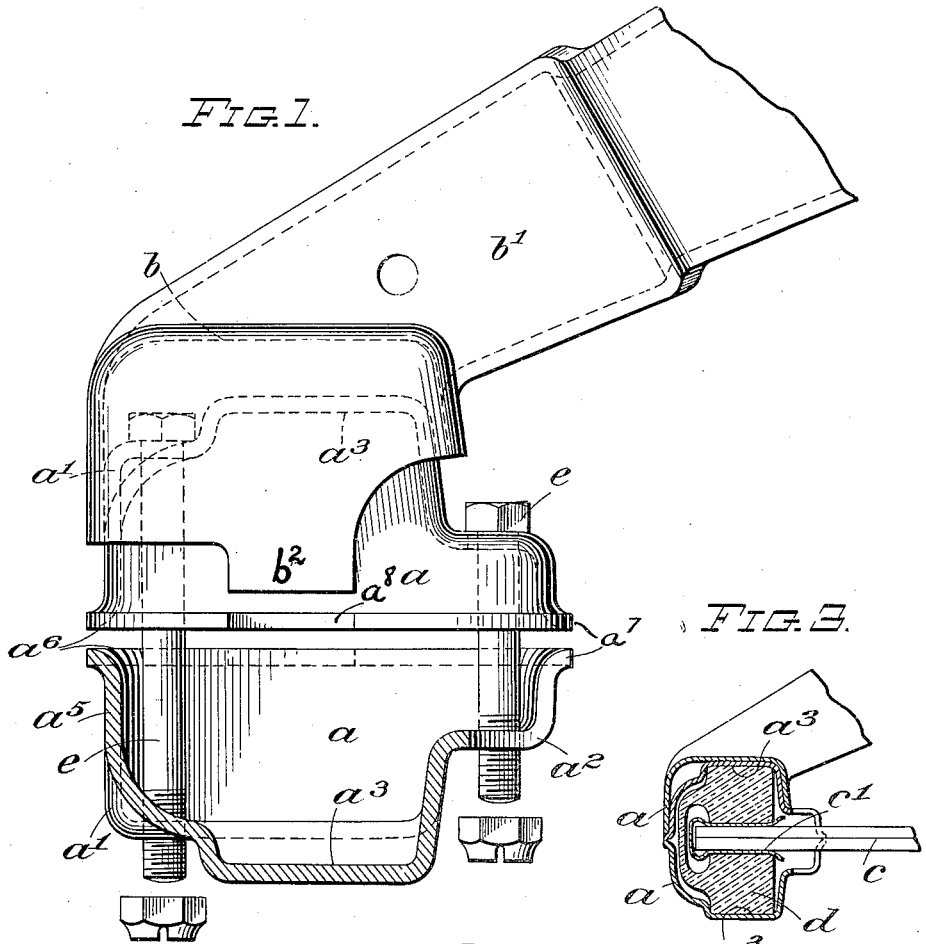
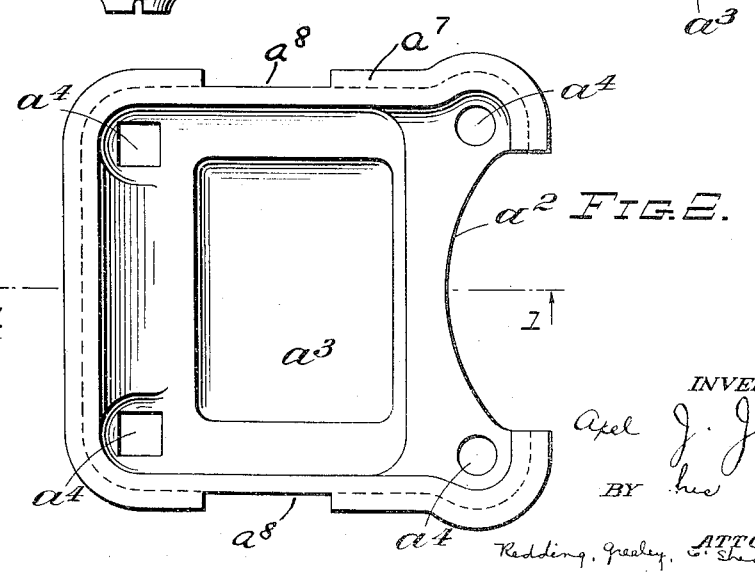
INVENTOR
Axel J. Jansson
BY his
Redding, Greeley, O'Shea & Campbell
ATTORNEYS Patented Dec. 14, 1926.

1,610,787

UNITED STATES PATENT OFFICE.

AXEL J. JANSSON, OF HILLSIDE, NEW JERSEY, ASSIGNOR, BY MESNE ASSIGNMENTS, TO INTERNATIONAL MOTOR COMPANY, OF NEW YORK, N. Y., A CORPORATION OF DELAWARE.

CUSHION CONNECTION FOR VEHICLE CONSTRUCTION.

Application filed May 18, 1925. Serial No. 30,923.

This invention relates in general to cushion connections for vehicle construction of the kind in which yielding non-metallic material serves as a connection and support between two metallic parts of a motor vehicle, one of which parts is to be connected to and supported by the other of said parts. Such a connection and support is illustrated in the U. S. patent to Masury & Leipert, No. 1,404,876, dated January 31, 1922. More particularly the invention relates to a housing for the yielding non-metallic material. Such cushion connections are applicable in many situations about a motor vehicle as supports, for instance, for the motor, transmission, radiator and the like as well as connections and supports between the vehicle springs and the chassis frame. The principal object of the present invention is to provide a housing for a cushion connection of the character described which shall be applicable in practically any situation where such cushion connection is desired and which may be readily, conveniently and cheaply formed by simple manufacturing operations. To this end the housing is formed of substantially identical complementary interchangeable sections. Two such complementary sections are preferably secured together as by means of bolts to form the housing as a whole and each section is provided with an exterior seat portion for engagement with a complementary seat portion formed on one of the vehicle parts or on a bracket to be secured to the vehicle part, the other vehicle part entering the housing in the usual manner through an aperture formed in one side thereof by cut away portions in the respective walls of the housing sections. Interiorly, the respective sections may be formed with a seat for the yielding non-metallic material whereby, upon assembly, the yielding non-metallic material may be positioned within the housing between the opposed seats and retained under the desired degree of compression. The walls of the respective sections may be of predetermined height so that when drawn into abutting relationship by means of through bolts a predetermined degree of compression may be exerted upon the yielding non-metallic material. In order that the invention may be clearly understood and readily carried into effect the same will now be described more fully with reference to the accompanying drawing illustrating a preferred embodiment thereof, in which:

Figure 1 is a view in side elevation and partly in section taken in the plane indicated by the line 1—1 in Figure 2 and looking in the direction of the arrows and showing the housing and bracket therefor, the component elements being spaced from one another to illustrate the manner of assembly and the interchangeability of the respective housing sections.

Figure 2 is a plan view showing one of the housings.

Figure 3 is a view on a reduced scale showing one of the cushion connections wherein yielding non-metallic material is contained within a housing according to the present invention carried with one of the chassis parts and engaging another vehicle part.

Referring to the drawings, the housing proper comprises two substantially identical cup-shaped sections $a$ preferably formed of pressed sheet metal to the desired configuration. Exteriorly, the section $a$ is formed with a seat portion $a'$ adapted to be secured in any convenient manner as by welding or rivets to a complementary seat portion $b$ formed upon one of the vehicle parts or if desired upon a bracket $b'$ to be secured to one of the vehicle parts. A portion of one of the walls of the housing section is cut away as at $a^2$ to provide half of a space through which another vehicle part may enter the housing to be engaged by yielding non-metallic material retained therein. In Figure 3 such vehicle part is illustrated as a spring $c$ entering the housing in the manner described and engaged by a block of yielding non-metallic material, such as rubber, $d$. Interiorly, each housing section is formed with a seat portion $a^3$ for the reception of the yielding non-metallic material, block $d$ being retained between opposed seats $a^3$ and positioned thereby. Suitable apertures $a^4$ are illustrated at the respective corners of the housing, for the reception of through bolts $e$.

Upon assembly the block $d$ may be assembled upon seats $c'$ carried with the end of member $c$ and a pair of sections $a$, $a$ may be assembled upon the block, as illustrated and secured together by the bolts $e$. Preferably the side walls $a^5$ are of predetermined height so that when the opposed edges $a^6$ are drawn together in abutting relation by the bolts e the desired degree of compression will be exerted upon the yielding non-metallic material since by so compressing the material its resiliency, strength and wearing qualities are increased.

Due to the action of the spring in flexing and the like the cups $a$ have a tendency to relative movement with respect to each other along the contacting edges $a^6$ which if not prevented would cause wear between the bolts and bolt holes. In order to prevent such relative movement a locking device is provided which engages recesses in the respective flanges $a^7$ of the assembled cups. In the illustrated embodiment the cut-away portions are indicated at $a^8$ and the locking device is shown as formed on the seat member $b$ as at $b^2$. When the cups are assembled and disposed in the seat on the frame the locking member engages the cut-away portions $a^8$ in both cups and serves to prevent relative movement therebetween.

It will thus be seen that a housing has been provided which is formed of two identical sections manufactured in a simple stamping operation and capable of assembly into a complete unit.

Various modifications may be made in the configuration and manner of assembly of the component elements of the device according to the present invention without departing from the spirit and scope of the invention

What I claim is:

1. A housing for a connection and support of yielding non-metallic material adapted to be interposed between two metallic parts of a motor vehicle, one of which parts is to be connected to and supported by the other of said parts comprising two substantially identical, interchangeable sections engageable with a seat on one of the vehicle parts and each having a portion of one side cut away for the passage of the other vehicle part and formed inwardly with a seat for the yielding non-metallic material, and means to secure the sections together.

2. A housing for a connection and support of yielding non-metallic material adapted to be interposed between two metallic parts of a motor vehicle, one of which parts is to be connected to and supported by the other of said parts comprising two substantially identical, interchangeable pressed metal sections, engageable with a seat on one of the vehicle parts and each of which has one side cut away to permit the other vehicle part to enter the housing to be engaged by the yielding non-metallic material and formed inwardly with a seat for the non-metallic material, and means to secure the sections together.

3. A housing for a connection and support of yielding non-metallic material adapted to be interposed between two metallic parts of a motor vehicle, one of which parts is to be connected to and supported by the other of said parts comprising two substantially identical, interchangeable cup-shaped sections engageable with a seat on one of the vehicle parts and each having one side cut away to permit the other vehicle part to enter the housing to be engaged by the yielding non-metallic material and formed inwardly with a seat for the yielding non-metallic material and formed outwardly with a seating surface to cooperate with the seat carried with the first named vehicle part, apertures formed in the respective sections, and bolts passing through the apertures to secure the sections together.

4. A housing for a connection and support of yielding non-metallic material adapted to be interposed between two metallic parts of a motor vehicle, one of which parts is to be connected to and supported by the other of said parts, comprising two substantially identical, interchangeable sections, means to secure one of said sections to one of the vehicle parts and each section having a portion of one side cut away for the passage of the other vehicle part and formed inwardly with a seat for the yielding non-metallic material.

5. A housing for a connection and support of yielding non-metallic material adapted to be interposed between two metallic parts of a motor vehicle, one of which parts is to be connected to and supported by the other of said parts comprising two substantially identical interchangeable sections engageable with a seat on one of the vehicle parts and each having a portion of one side cut away for the passage of the other vehicle part and formed inwardly with a seat for the yielding non-metallic material, means to secure the sections together, and means to prevent relative movement between the sections.

6. A housing for a connection and support of yielding non-metallic material adapted to be interposed between two metallic parts of a motor vehicle, one of which parts is to be connected to and supported by the other of said parts, comprising two substantially identical, interchangeable pressed metal sections, each of said sections being engageable with one of the vehicle parts and each having a portion of one side cut away for the passage of the other vehicle part and formed inwardly with a seat for the yielding non-metallic material, and outwardly with a surface for engagement with the first named vehicle part.

This specification signed this 14th day of May, A. D. 1925.

AXEL J. JANSSON.